F. AND S. R. BRISTOW.
LETTER AND DOCUMENT DISTRIBUTER.
APPLICATION FILED JULY 24, 1916.

1,316,015.

Patented Sept. 16, 1919.
3 SHEETS—SHEET 1.

WITNESS
Howard P. King.

INVENTORS:
Frederick Bristow
Stanley R. Bristow
BY
Russell M. Everett,
ATTORNEY.

F. AND S. R. BRISTOW.
LETTER AND DOCUMENT DISTRIBUTER.
APPLICATION FILED JULY 24, 1916.

1,316,015.

Patented Sept. 16, 1919.
3 SHEETS—SHEET 2.

WITNESS:
Howard P. King.

INVENTORS:
Frederick Bristow
Stanley R. Bristow
BY
Russell M. Everett,
ATTORNEY.

F. AND S. R. BRISTOW.
LETTER AND DOCUMENT DISTRIBUTER.
APPLICATION FILED JULY 24, 1916.

1,316,015.

Patented Sept. 16, 1919.
3 SHEETS—SHEET 3.

WITNESS:
Howard P. King.

INVENTORS:
Frederick Bristow
Stanley R. Bristow
BY
Russell M. Everett,
ATTORNEY.

UNITED STATES PATENT OFFICE.

FREDERICK BRISTOW AND STANLEY R. BRISTOW, OF EAST ORANGE, NEW JERSEY.

LETTER AND DOCUMENT DISTRIBUTER.

1,316,015.   Specification of Letters Patent.   Patented Sept. 16, 1919.

Application filed July 24, 1916. Serial No. 110,903.

*To all whom it may concern:*

Be it known that we, FREDERICK BRISTOW and STANLEY R. BRISTOW, both citizens of the United States, and residents of East Orange, in the county of Essex and State of New Jersey, have invented certain new and useful Improvements in Letter and Document Distributers, of which the following is a specification.
This invention relates to that class of device represented by the one shown in Patent No. 753,538 of March 1, 1904 to Frederick Bristow, and the objects of the present improvements are to provide a construction which can be made of metal and thus avoid the warping and shrinkage and swelling to which wood is liable; to secure a stronger and more durable construction; to provide spacing members which are independent one from another and adapted to receive the partitions between themselves, to secure such spacing members which shall resiliently grasp the partitions frictionally, and hold them firmly and stably in place; to support said spacing members so that they cannot be displaced by or yield under the pressure of the partitions; to secure a simple and substantial construction, which shall be durable and not likely to get out of order, and to obtain other advantages and results as may be brought out in the following description.

Referring to the accompanying drawings, in which like numerals of reference indicate the same parts throughout the several views, Figure 1 is an end elevation of our improved distributer;

In the specific embodiment of the invention shown in said drawings, 1 indicates a substantially semi-cylindrical body portion adapted to rest at its flat surface upon a desk or the like and to receive at its upper rounded surface a series of longitudinal partitions 2 which project radially from the cylindrical surface and form between themselves spaces which are preferably open at their ends and outer edges to receive papers or the like. The cylindrical surface of the body is formed by longitudinally extending bars 3 between which the partitions 2 can be removably inserted, and thus compartments of different sizes or capacities can be obtained by inserting any number of partitions wherever desired.

Figure 4:
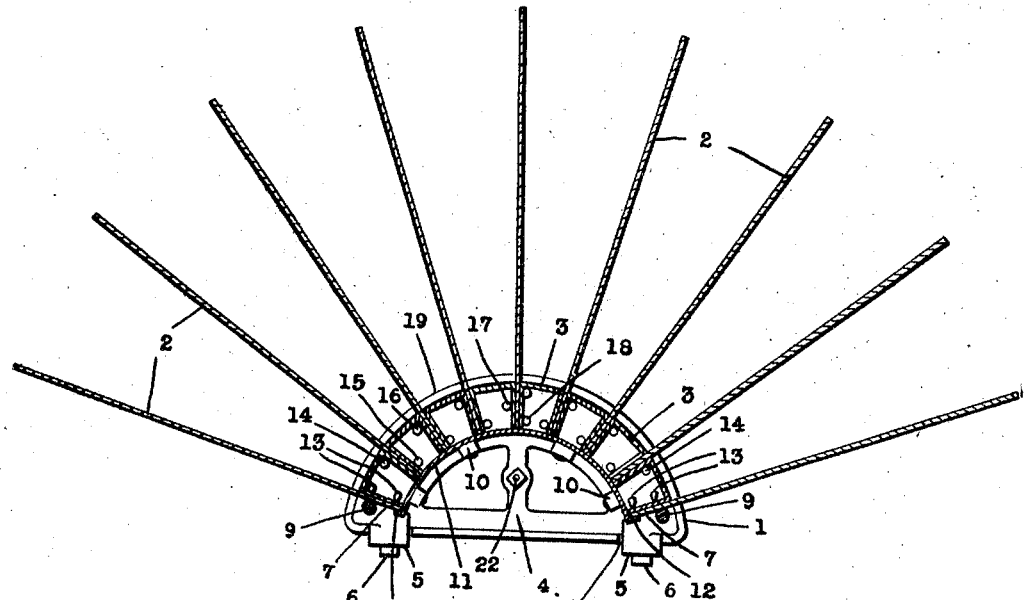
Fig. 4 is a cross-section of the complete device, taken on line 4—4 Fig. 2.
Figure 9:
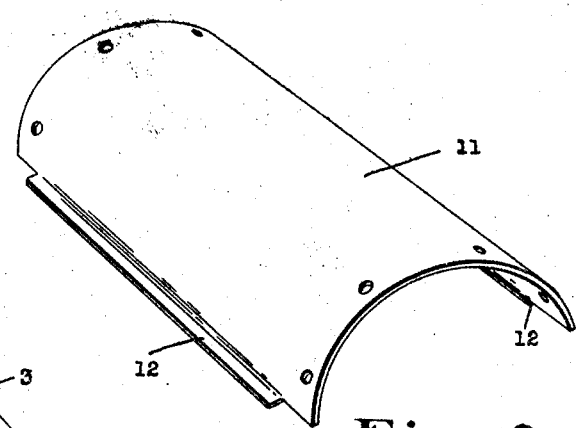
Fig. 9 is a detail perspective of the semi-cylindrical bottom plate.

Said body 1 comprises end pieces 4, 4, each being of the form of a semi-circle and having at the opposite ends of its straight side feet 5, 5 to engage the table or desk, preferably by cushions 6. These feet 5 provide at the inner facing sides of the end plates shoulders 7 which are on each plate inclined downwardly toward each other diametrically of the plate and serve to receive the opposite lowest partitions 2, 2; said shoulders 7 also have at their edges toward the other end plate notches or recesses 8 to receive the ends of rods 9 which extend from end piece to end piece with their upper sides substantially flush with said shoulders and therefore supporting the opposite lowest partitions 2, 2. Each end piece is provided at its side toward the other with a semi-circular series of ears 10 positioned inwardly from the outer curved edge of the end piece and adapted to receive a semi-cylindrical bottom 11 which rests on said ears and is preferably riveted to them, thus connecting the end pieces. The opposite longitudinal edges of this bottom plate, see Figs. 9 and 4, are bent upward as at 12, 12 to receive the inner edges of the opposite lowest partitions 2 which rest upon the rods 9, the curved portion of the plate serving as a stop for the partitions which abut thereagainst at their inner edges.

Figure 5:
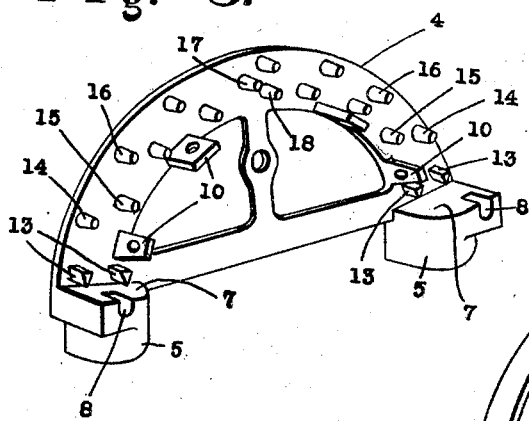
Fig. 5 is a detail perspective view of one of the end pieces of the distributer.

Outside said bottom plate 11 and extending from one rod 9 to the other, is the series of spacing bars 3 between which the partitions are inserted, said bars preferably being formed each of sheet metal bent up into channel form with the side flanges slightly converging to conform to the curvature of the series. These bars rest at their inner edges upon the said bottom plate 11 and are supported upon the end pieces 4, 4 in the following manner: Adjacent each shoulder 7 are two lugs 13, 13 between which and said shoulder there is room only for one of the flanges of the first bar and a partition, as shown in Fig. 4, and higher up on the end piece near its outer edge is another lug 14 which the channel bar will also inclose as it is slipped into place, its upper flange lying above said lug 14. The next lug 15 is near the bottom plate 11 so that the lower flange of the next bar passes beneath it, allowing sufficient room for a partition to be forced between the two bars, and then there is a lug 16 above said lug 14 and near the outer edge of the end piece, like the lug 13 before described. This arrangement of lugs continues upward at both ends of each end piece until at the top, at the middle of the end piece, two outer lugs would come next to each other, when one of them as 17 is set half way in on the end piece and an extra lug 18 is provided near the inner edge of the end piece opposite the other outer lug, all as shown in Figs. 4 and 5.

By this construction, it will be observed, each inclined partition bears upward at its extreme inner edge against an inner lug at each end of itself and at a distance out from said inner edge it bears downward against an outer lug at each end of itself. The partitions are thus rigidly and unyieldingly supported against the downward strain of papers or the like put into the compartment, and at the same time the adjacent flanges of any two bars can separate at their inner edges because there are lugs on only one side of them. This insures that each partition is resiliently gripped, frictionally, when inserted between two bars, and is thus securely held so that it is neither loose nor will it drop out if the entire distributer is inverted. The partitions are at the same time very readily and easily inserted and removed, and they are so tightly held that there is no possibility of papers slipping down between them and the bars 3.

Figure 6:
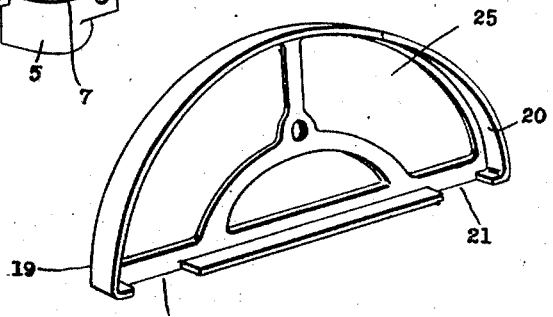
Fig. 6 is a detail perspective view of one of the retainers for the ends of the distributer.
Figure 7:
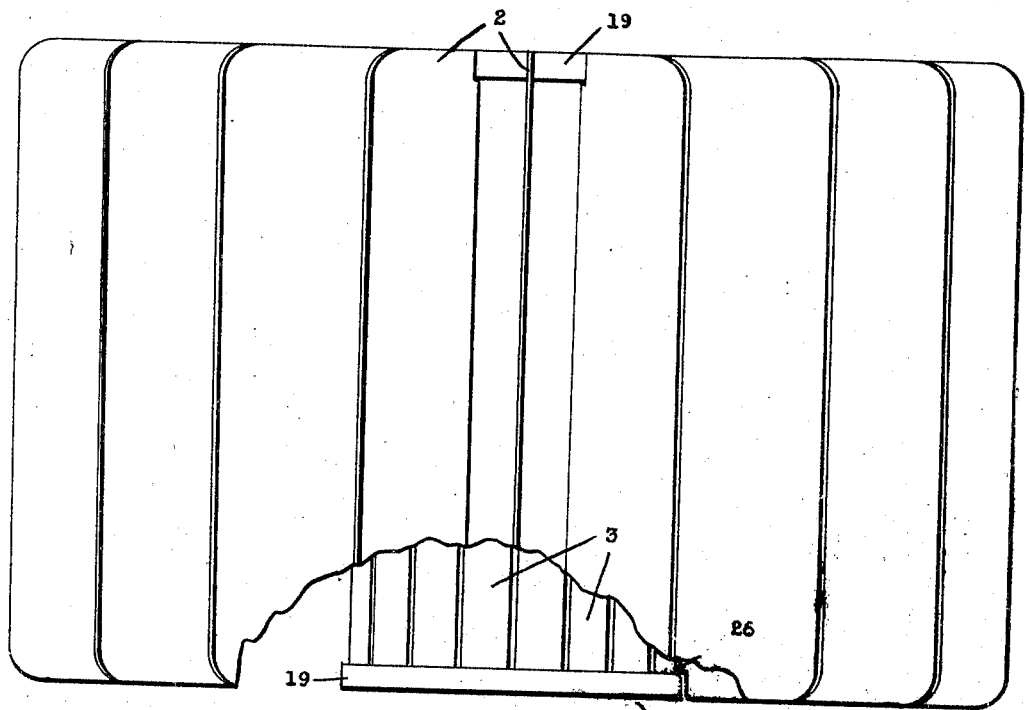
Fig. 7 is a plan view of the distributer;
Figure 8:
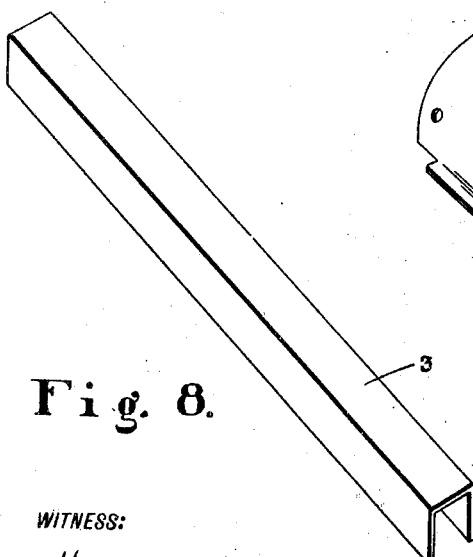
Fig. 8 is a detail perspective view of one of the spacing bars.

As described, the series of bars 3 rest at their inner edges upon the bottom plate 11, and to hold them against outward escape retainers 19 are employed for the outer sides of the end pieces. These retainers, one of which is shown in Fig. 5, preferably comprise each a frame adapted to fit against an end piece and thus of substantially the same semi-circular or semi-elliptic shape, or a little larger, being provided with a peripheral flange 20 projecting laterally to overlie the edges of the end plate and series of bars 3, as most clearly shown in Fig. 2. This flange 20 is suitably recessed or cut away at the lower edge of the retainer, as at 21, 21, Fig. 6, to receive the feet 5, and since the flange portion between the feet does not need to extend in beyond the end piece, it can be somewhat narrower than for the upper curved portion of the retainer, as shown. These retainers are preferably secured to the end pieces removably, as by bolts 22, and hold between themselves and the end piece index cards 23 each of which has memorandum spaces 24 corresponding to the compartments of the distributer, the retainer being apertured or being open as at 25 to expose the card. The card is preferably left blank for writing any desired matter thereon and is made erasable, although obviously a new card can be inserted whenever desired by removing the bolt 22, and the various subjects could be printed on the card as desired. Any suitable card, adapted to be removably held by the retainer in any suitable way, can be employed.

Figure 1:
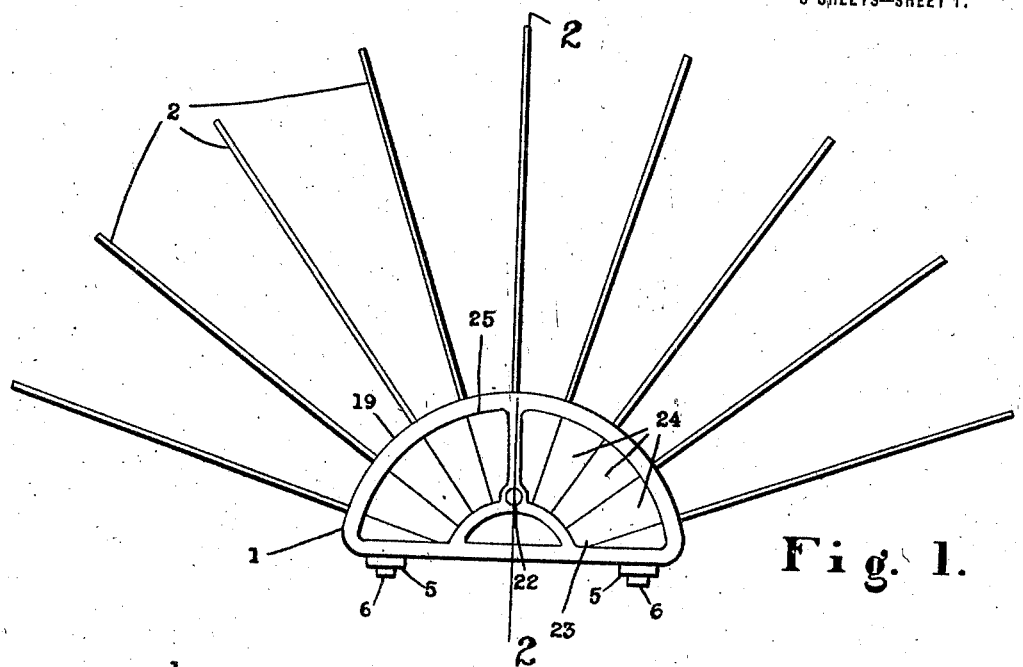
Figure 3:
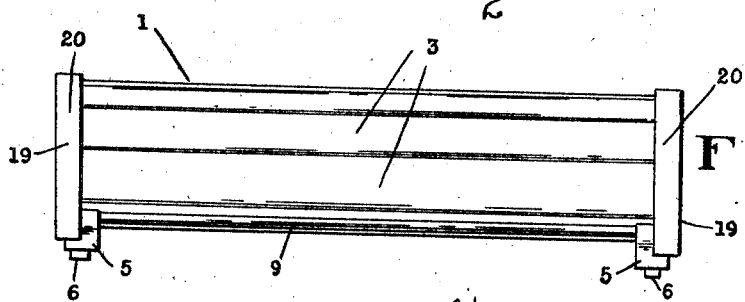
Fig. 3 is a side elevation of the body portion of the device, with the partitions removed.
Figure 2:
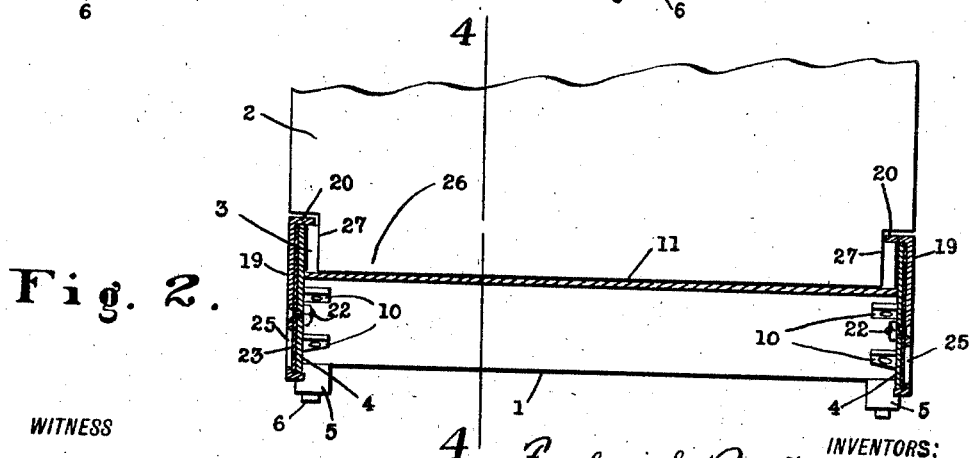
Fig. 2 is a vertical longitudinal section taken through the same on line 2—2 Fig. 1.

The partitions 2 are preferably made of sheet metal and are of a width equal to the outside length of the distributer, being notched at the inner corners as shown in Fig. 2 to form a reduced extension or tongue 26 to enter the slots between the bars 3 and end shoulders 27 to seat against the retainers.

Obviously various detail modifications and changes other than those mentioned may be made in manufacturing our improved distributer without departing from the spirit and scope of the invention, and we do not wish to be understood as restricting ourselves except as required by the following claims when construed in the light of the prior art.

Having thus described the invention, what we claim is:

1. In a device of the character described, the combination with a series of sheet metal bars adapted to lie adjacent each other and provide between themselves grooves or slits with resilient walls, of opposite end pieces adapted at their adjacent sides to receive said bars, and means for securing said end pieces together.

2. In a device of the character described, the combination with a series of channel bars having resilient side flanges and adapted to lie adjacent each other and provide grooves or slits therebetween, of opposite end pieces adapted at their adjacent sides to receive said bars, and means for securing said end pieces together.

3. In a device of the character described, the combination with a series of sheet metal channel bars adapted to lie adjacent each other and provide grooves or slits therebetween, of opposite end pieces each having at its inner side a bottom support for one of said bars and above said support a series of pairs of lugs the lower one of each pair being set in from the edge of the end piece to engage the inner edge of the lower flange of a bar and the upper one being set out near the edge of the end piece to engage the outer edge of the upper flange of the bar, both said lugs being inside the bar, and means for securing said end pieces together.

4. In a device of the character described, the combination with a series of sheet metal channel bars adapted to lie adjacent each other and receive partitions between them, of opposite end pieces each having at its inner side supporting means for each of said bars projecting inside the bars and leaving one of each pair of adjacent flanges of adjacent bars free to move with respect to the other, and means for securing said end pieces together.

5. In a device of the character described, the combination with a series of bars adapted to lie adjacent each other and provide grooves or slits therebetween, of opposite end pieces adapted at their adjacent sides to receive said bars, a bottom plate extending from one end piece to the other and secured thereto, and retainers outside said end pieces overlapping the same and the ends of the bars to prevent outward displacement thereof.

6. In a device of the character described, the combination with a series of bars adapted to lie adjacent each other and provide grooves or slits therebetween, of opposite end pieces adapted at their adjacent sides to receive said bars, a transversely curved bottom plate secured to said end pieces between the same and closing the grooves between the bars from beneath, and retainers outside said end pieces overlapping the same and the ends of the bars to prevent outward displacement thereof.

7. In a device of the character described, the combination with a series of bars adapted to lie adjacent each other and provide grooves or slits therebetween, of opposite end pieces adapted at their adjacent sides to receive said bars, a transversely curved bottom plate secured to said end pieces between the same and closing the grooves between the bars from beneath, and retainers outside said end pieces having flanges overlapping the same at their top and bottom edges and also overlapping the ends of the bars to prevent outward displacement thereof.

8. In a device of the character described, the combination with a series of bars adapted to lie adjacent each other and provide grooves or slits therebetween, of opposite end pieces adapted at their adjacent sides to receive said bars, a bottom plate extending from one end piece to the other and secured thereto, retainers outside said end pieces overlapping the same and the ends of the bars, and partitions having tongues or extensions to enter said grooves or slits and adapted to overlap said retainers.

9. In a device of the character described, the combination of a series of bars adapted to lie adjacent each other and having sides of increasing resiliency toward their inner edges, and partitions adapted to be forced in between said bars and held thereby.

10. In a device of the character described, a curved series of channel bars arranged adjacent each other, each bar being formed of sheet metal with its side flanges converging toward their free edges and resiliently engaging the adjacent side flanges of the next bars.

11. In a device of the character described, the combination of a series of adjacent bars having resilient walls lying adjacent each other, and partitions adapted to be inserted between said bars and held thereby.

12. In a device of the character described, the combination with a series of sheet metal channel bars arranged side by side with the flanges of adjacent bars forming grooves or slits with resilient walls, and partitions adapted to be inserted in said grooves or slits.

13. In a device of the character described, the combination with partitions, of channel bars alternating with said partitions and having their side flanges engaging the partitions flatwise and resiliently, whereby a close engagement is secured to hold the partitions and prevent the entrance of papers between them and the bars.

14. In a device of the character described, the combination with a series of bars adapted to receive partitions between themselves, of end pieces at the opposite ends of said bars and retainers outside said end pieces, each end piece and retainer adapted to receive between themselves an index card or the like and removably hold the same.

15. In a device of the character described, the combination with a series of bars adapted to receive partitions between themselves, of an end piece and a retainer adapted to coöperate in receiving and holding said bars at one end of themselves, said end piece and retainer also adapted to receive between themselves and removably hold an index card or the like, and means for receiving and holding the other ends of said bars.

FREDERICK BRISTOW.
STANLEY R. BRISTOW

Copies of this patent may be obtained for five cents each, by addressing the "Commissioner of Patents. Washington, D. C."